United States Patent
Chen et al.

(10) Patent No.: US 11,163,799 B2
(45) Date of Patent: Nov. 2, 2021

(54) AUTOMATIC ROLLBACK TO TARGET FOR SYNCHRONOUS REPLICATION

(71) Applicant: Dell Products L.P., Round Rock, TX (US)

(72) Inventors: Xiangping Chen, Sherborn, MA (US); Svetlana Kronrod, Concord, MA (US)

(73) Assignee: Dell Products L.P., Round Rock, TX (US)

(*) Notice: Subject to any disclaimer, the term of this patent is extended or adjusted under 35 U.S.C. 154(b) by 248 days.

(21) Appl. No.: 16/667,453

(22) Filed: Oct. 29, 2019

(65) Prior Publication Data

US 2021/0124762 A1 Apr. 29, 2021

(51) Int. Cl.
*G06F 16/27* (2019.01)
*G06F 16/23* (2019.01)
*G06F 11/14* (2006.01)

(52) U.S. Cl.
CPC ........ *G06F 16/275* (2019.01); *G06F 11/1446* (2013.01); *G06F 16/2365* (2019.01); *G06F 16/27* (2019.01); *G06F 2201/84* (2013.01)

(58) Field of Classification Search
CPC .............................. G06F 16/27; G06F 16/275
See application file for complete search history.

(56) References Cited

U.S. PATENT DOCUMENTS

| | | | |
|---|---|---|---|
| 7,200,626 B1 * | 4/2007 | Hoang | G06F 11/0751 |
| 7,475,124 B2 | 1/2009 | Jiang et al. | |
| 7,478,101 B1 * | 1/2009 | Manley | G06F 11/1451 |
| 8,145,603 B2 * | 3/2012 | Yamagami | G06F 11/1471 707/648 |
| 8,327,103 B1 | 12/2012 | Can et al. | |
| 8,380,928 B1 | 2/2013 | Chen et al. | |
| 8,429,346 B1 | 4/2013 | Chen et al. | |
| 8,515,911 B1 | 8/2013 | Zhou et al. | |
| 8,539,148 B1 | 9/2013 | Chen et al. | |
| 8,566,483 B1 | 10/2013 | Chen et al. | |
| 8,583,607 B1 | 11/2013 | Chen et al. | |
| 8,683,153 B1 | 3/2014 | Long et al. | |
| 8,712,976 B1 | 4/2014 | Chen et al. | |

(Continued)

OTHER PUBLICATIONS

U.S. Appl. No. 15/499,943, filed Apr. 28, 2017, Kucherov et al.

(Continued)

*Primary Examiner* — Charles E Lu

(74) *Attorney, Agent, or Firm* — Daly, Crowley, Mofford & Durkee, LLP

(57) ABSTRACT

A method is disclosed for use in a storage system including a source system that is coupled to a target system, the method comprising: detecting a rollback event that is associated with a source volume Vs; and performing a rollback of the source volume Vs in response to the rollback event, wherein performing the rollback of the source volume Vs includes: identifying a target snapset Sr to be rolled back to, the target snapset Sr having a creation time Tr; identifying a snapset recovery pair including a source snapset Sk and a target snapset Sk', the source snapset having a creation time Ts, and the target snapset having a creation time Tt, such that $Tr \leq Ts \leq Tt$; assigning the source volume Vs to the source snapset Sk; and update the source volume Vs based on a difference between the target snapset Sr and the target snapset Sk'.

20 Claims, 8 Drawing Sheets

(56) References Cited

U.S. PATENT DOCUMENTS

| | | |
|---|---|---|
| 8,775,388 B1 | 7/2014 | Chen et al. |
| 8,782,324 B1 | 7/2014 | Chen et al. |
| 8,799,601 B1 | 8/2014 | Chen et al. |
| 8,909,887 B1 | 12/2014 | Armangau et al. |
| 8,930,746 B1 | 1/2015 | Chen et al. |
| 8,954,699 B1 | 2/2015 | Chen et al. |
| 8,977,812 B1 | 3/2015 | Chen et al. |
| 9,032,160 B1 * | 5/2015 | Natanzon ............... G06F 11/073 711/141 |
| 9,152,336 B1 | 10/2015 | Chen et al. |
| 9,304,889 B1 | 4/2016 | Chen et al. |
| 9,355,112 B1 | 5/2016 | Armangau et al. |
| 9,384,206 B1 | 7/2016 | Bono et al. |
| 9,395,937 B1 | 7/2016 | Si et al. |
| 9,449,011 B1 | 9/2016 | Chen et al. |
| 9,459,809 B1 | 10/2016 | Chen et al. |
| 9,460,102 B1 | 10/2016 | Bono et al. |
| 9,477,431 B1 | 10/2016 | Chen et al. |
| 9,513,814 B1 | 12/2016 | Can et al. |
| 9,529,545 B1 | 12/2016 | Bono et al. |
| 9,542,125 B1 | 1/2017 | Chen |
| 9,563,517 B1 * | 2/2017 | Natanzon ............... G06F 11/1464 |
| 9,594,514 B1 | 3/2017 | Bono et al. |
| 9,684,593 B1 | 6/2017 | Chen et al. |
| 9,710,187 B1 | 7/2017 | Si et al. |
| 9,811,288 B1 | 11/2017 | Chen et al. |
| 9,817,766 B1 | 11/2017 | Si et al. |
| 10,037,369 B1 | 7/2018 | Bono et al. |
| 10,082,959 B1 | 9/2018 | Chen et al. |
| 10,095,428 B1 | 10/2018 | Meiri et al. |
| 10,146,637 B1 * | 12/2018 | Chopra ............... G06F 11/1464 |
| 10,152,381 B1 | 12/2018 | Shvaiger et al. |
| 10,176,046 B1 | 1/2019 | Hu et al. |
| 10,235,066 B1 | 3/2019 | Chen et al. |
| 10,248,623 B1 | 4/2019 | Chen et al. |
| 10,261,853 B1 | 4/2019 | Chen et al. |
| 10,310,951 B1 | 6/2019 | Chen et al. |
| 10,324,640 B1 | 6/2019 | Chen et al. |
| 10,338,851 B1 | 7/2019 | Kronrod et al. |
| 10,353,616 B1 | 7/2019 | Tao et al. |
| 10,359,968 B1 | 7/2019 | Chen et al. |
| 10,374,792 B1 | 8/2019 | Meiri et al. |
| 10,394,485 B1 | 8/2019 | Chen et al. |
| 10,402,283 B1 | 9/2019 | Chen et al. |
| 10,409,493 B1 | 9/2019 | Kucherov et al. |
| 10,459,632 B1 | 10/2019 | Chen et al. |
| 10,459,883 B1 | 10/2019 | Meiri et al. |
| 10,496,489 B1 | 12/2019 | Chen et al. |
| 10,496,668 B1 | 12/2019 | Meiri et al. |
| 10,496,672 B2 | 12/2019 | Meiri et al. |
| 10,565,058 B1 | 2/2020 | Meiri et al. |
| 10,797,952 B1 * | 10/2020 | Mills ............... H04L 41/0893 |
| 2007/0174569 A1 * | 7/2007 | Schnapp ............... G06F 3/0631 711/162 |
| 2007/0271431 A1 * | 11/2007 | Hwang ............... G06F 11/1471 711/162 |
| 2014/0172802 A1 * | 6/2014 | Kato ............... G06F 11/1446 707/639 |
| 2014/0208028 A1 * | 7/2014 | Coronado ............... G06F 3/0619 711/118 |
| 2015/0019496 A1 * | 1/2015 | Stewart ............... G06F 16/256 707/649 |

OTHER PUBLICATIONS

U.S. Appl. No. 15/499,949, filed Apr. 28, 2017, Chen et al.
U.S. Appl. No. 15/499,951, filed Apr. 28, 2017, Chen et al.
U.S. Appl. No. 15/656,168, filed Jul. 21, 2017, Hu et al.
U.S. Appl. No. 15/656,170, filed Jul. 21, 2017, Chen et al.
U.S. Appl. No. 15/797,324, filed Oct. 30, 2017, Chen et al.
U.S. Appl. No. 16/042,363, filed Jul. 23, 2018, Chen et al.
U.S. Appl. No. 16/038,543, filed Jul. 18, 2018, Chen et al.
U.S. Appl. No. 16/048,767, filed Jul. 30, 2018, Chen et al.
U.S. Appl. No. 16/169,202, filed Oct. 24, 2018, Chen et al.
U.S. Appl. No. 16/177,782, filed Nov. 1, 2018, Hu et al.
U.S. Appl. No. 16/167,858, filed Oct. 23, 2018, Chen et al.
U.S. Appl. No. 16/175,979, filed Oct. 31, 2018, Hu et al.
U.S. Appl. No. 16/157,528, filed Oct. 11, 2018, Chen et al.
U.S. Appl. No. 16/162,786, filed Oct. 17, 2018, Hu et al.
U.S. Appl. No. 16/164,005, filed Oct. 18, 2018, Chen et al.
U.S. Appl. No. 16/264,825, filed Feb. 1, 2019, Chen et al.
U.S. Appl. No. 16/254,899, filed Jan. 23, 2019, Chen et al.
U.S. Appl. No. 16/254,897, filed Jan. 23, 2019, Chen et al.
U.S. Appl. No. 16/264,982, filed Feb. 1, 2019, Chen et al.
U.S. Appl. No. 16/263,414, filed Jan. 31, 2019, Meiri et al.
U.S. Appl. No. 16/375,001, filed Apr. 4, 2019, Chen et al.
U.S. Appl. No. 16/380,087, filed Apr. 10, 2019, Kronrod et al.
U.S. Appl. No. 16/592,271, filed Oct. 3, 2019, Chen et al.
U.S. Appl. No. 16/592,328, filed Oct. 3, 2019, Barabash et al.
U.S. Appl. No. 16/667,453, filed Oct. 29, 2019, Chen et al.
U.S. Appl. No. 16/668,661, filed Oct. 30, 2019, Kronrod et al.
U.S. Appl. No. 16/743,274, filed Jan. 15, 2020, Chen et al.
U.S. Appl. No. 16/747,169, filed Jan. 20, 2020, Chen et al.
U.S. Appl. No. 16/786,422, filed Feb. 10, 2020, Kronrod et al.
U.S. Appl. No. 16/788,461, filed Feb. 12, 2020, Chen et al.
U.S. Appl. No. 16/773,303, filed Jan. 27, 2020, Hu et al.
U.S. Appl. No. 16/511,676, filed Jul. 15, 2019, Chen et al.

\* cited by examiner

| 134 | | |
|---|---|---|
| SOURCE SNAPSET ID 312 | TARGET SNAPSET ID 314 | ⎫ 310 |
| SOURCE SNAPSET ID 312 | TARGET SNAPSET ID 314 | ⎫ 310 |
| SOURCE SNAPSET ID 312 | TARGET SNAPSET ID 314 | ⎫ 310 |
| SOURCE SNAPSET ID 312 | TARGET SNAPSET ID 314 | ⎫ 310 |
| ••• | ••• | |
| SOURCE SNAPSET ID 312 | TARGET SNAPSET ID 314 | ⎫ 310 |

FIG. 3

AUTOMATIC ROLLBACK TO TARGET FOR SYNCHRONOUS REPLICATION

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method for use in a storage system including a source system that is coupled to a target system, the method comprising: detecting a rollback event that is associated with a source volume Vs; and performing a rollback of the source volume Vs in response to the rollback event, wherein performing the rollback of the source volume Vs includes: identifying a target snapset Sr to be rolled back to, the target snapset Sr having a creation time Tr; identifying a snapset recovery pair including a source snapset Sk and a target snapset Sk', the source snapset having a creation time Ts, and the target snapset having a creation time Tt, such that $Tr \leq Ts \leq Tt$; assigning the source volume Vs to the source snapset Sk; and update the source volume Vs based on a difference between the target snapset Sr and the target snapset Sk', the updating including: (i) identifying, based on the target snapsets Sr and Sk', data that was stored in the source volume Vs when the snapset Sr was created and which was subsequently modified or deleted, and updating the source volume Vs based on the identified data after the source volume Vs is assigned to the source snapset Sk.

A system comprising: a memory; and at least one processor operatively coupled to the memory, the at least one processor being configured to perform the operations of detecting a rollback event that is associated with a source volume Vs, and performing a rollback of the source volume Vs in response to the rollback event, wherein performing the rollback of the source volume Vs includes: identifying a target snapset Sr to be rolled back to, the target snapset Sr having a creation time Tr, the target snapset Sr being stored in a target system; identifying a snapset recovery pair including a source snapset Sk and a target snapset Sk', the source snapset having a creation time Ts, and the target snapset having a creation time Tt, such that $Tr \leq Ts \leq Tt$; assigning the source volume Vs to the source snapset Sk; and update the source volume Vs based on a difference between the target snapset Sr and the target snapset Sk', the updating including: (i) identifying, based on the target snapsets Sr and Sk', data that was stored in the source volume Vs when the snapset Sr was created and which was subsequently modified or deleted, and updating the source volume Vs based on the identified data after the source volume Vs is assigned to the source snapset Sk.

A non-transitory computer-readable storage medium storing one or more processor-executable instructions, which, when executed by at least one processor of a storage system, cause the processor to perform the operations of: detecting a rollback event that is associated with a source volume Vs, and performing a rollback of the source volume Vs in response to the rollback event, wherein performing the rollback of the source volume Vs includes: identifying a target snapset Sr to be rolled back to, the target snapset Sr having a creation time Tr, the target snapset Sr being stored in a target system; identifying a snapset recovery pair including a source snapset Sk and a target snapset Sk', the source snapset having a creation time Ts, and the target snapset having a creation time Tt, such that $Tr \leq Ts \leq Tt$; assigning the source volume Vs to the source snapset Sk; and update the source volume Vs based on a difference between the target snapset Sr and the target snapset Sk', the updating including: (i) identifying, based on the target snapsets Sr and data that was stored in the source volume Vs when the snapset Sr was created and which was subsequently modified or deleted, and updating the source volume Vs based on the identified data after the source volume Vs is assigned to the source snapset Sk.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 3 is a state diagram illustrating an example of snapset pair definitions, according to aspects of the disclosure;

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1:
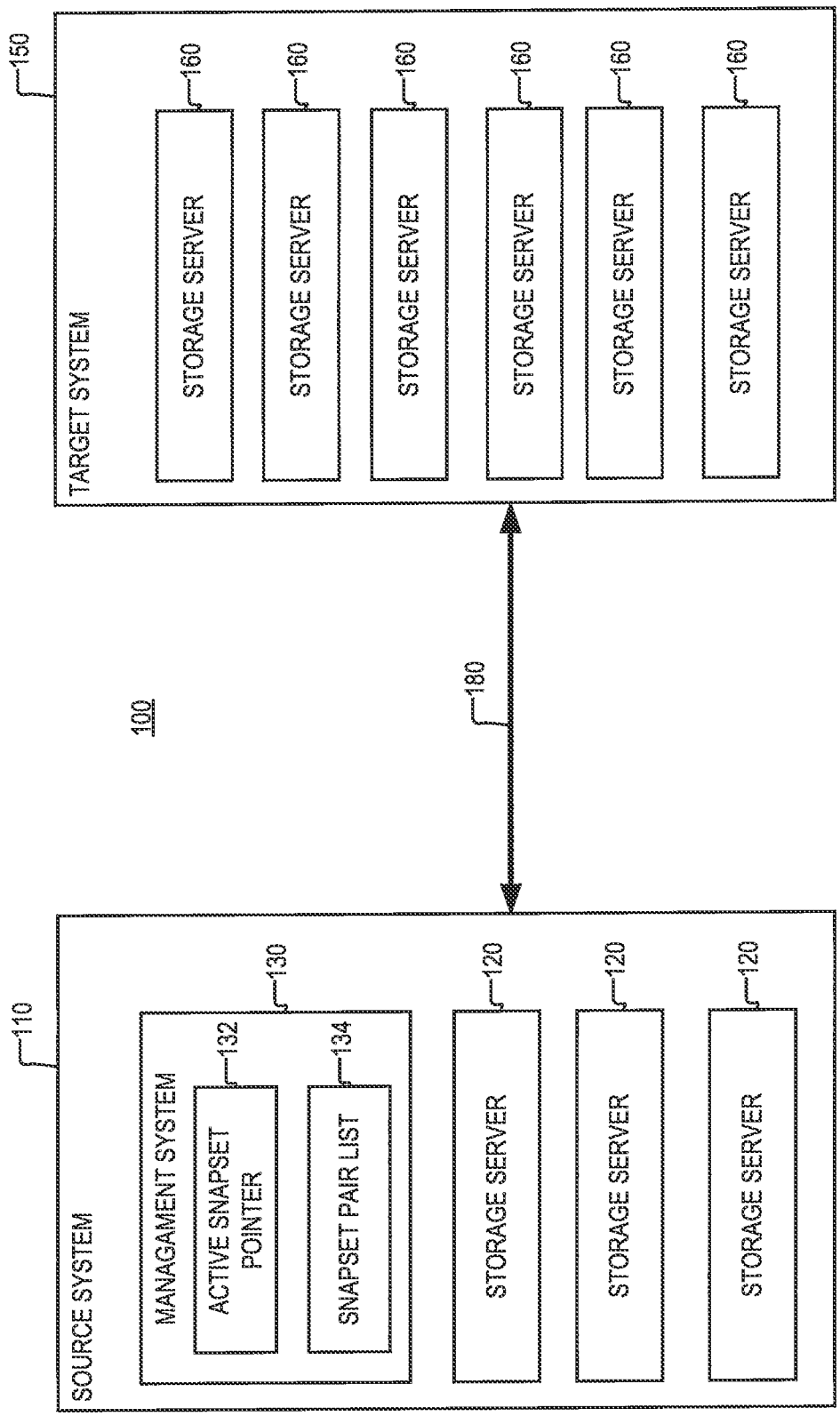
FIG. 1 is a diagram of an example of a storage system, according to aspects of the disclosure.

FIG. 1 is a diagram of an example of a storage system 100, according to aspects of the disclosure. The storage system 100 may include a midrange storage system, an enterprise storage system, and/or any other suitable type of storage system. As illustrated, the storage system 100 may include a source system 110 that is coupled to a target system 150 via a communications network 180. The communications network 180 may include an InfiniBand network, a TCP/IP network, and/or any other suitable type of communications network.

The source system 110 may include one or more storage clusters that are configured to maintain a set of one or more storage objects. Each of the storage objects may include a volume, a logical unit, and/or any other suitable type of storage object. Moreover, the source system 110 may be configured to generate snapshots of storage objects and replicate the snapshots to the target system 150. According to aspects of the disclosure, a snapshot may be a point-in time copy (also referred to as "replica" or "snap") of a storage object, such as a volume or a logical unit (LU). In some implementations, a snapshot may not replicate a full copy of a respective storage object. Rather, the snapshot may store only differences between a current version of the respective storage object and a past version of the respective storage object. In some implementations, snapshots may be organized in snapsets. According to aspects of the disclosure, a "snapset" may be a container that includes one or more snapshots, wherein each of the snapshots in the container is generated based on the contents of a different storage object. The set of one or more storage objects that are represented in a snapset may be referred to as a "consistency group."

In some implementations, one of the snapsets that are instantiated on the target system 150 may be the "active snapset" of the storage system 100 with respect to a particular consistency group. The active snapset of the storage system 100 (for the consistency group) may be one or more of (i) a snapset that is stored in the target system 150 where snapshot data (for the consistency group) is being streamed by the source system 110, or (ii) a snapset that is going to be used as a basis for the generation of a "next" snapset in the target system 150.

The source system 110 may include a plurality of storage servers 120 and a management system 130. Each of the storage servers 120 may be implemented by using a computing device, such as the computing device 800, which is discussed further below with respect to FIG. 8. In operation, each of the storage servers 120 may be configured to execute I/O requests that are received at the storage system 100, The I/O requests may include read requests, write requests, and/or any other suitable type of I/O request. Furthermore, in some implementations, the storage servers 120 and 160 may be configured to perform tasks related to snapshot generation and replication. Specifically, according to the present example, the storage servers 120 and 160 are configured to perform synchronous replication by generating snapshot data for received I/O requests and transmitting the generated snapshot data to the target system 150 concurrently with the servicing of the I/O requests.

The management system 130 may be implemented by using a computing device, such as the computing device 800, which is discussed further below with respect to FIG. 8. Although in the present example the management system 130 is implemented as a separate device, alternative implementations are possible in which the management system 130 is executed on one of the storage servers 120 and/or 160. Furthermore, in some implementations, the management system 130 may be implemented on a device that is situated outside of the storage system 100. Stated succinctly, the present disclosure is not limited to any specific implementation of the management system 130.

The target system 150 may include a plurality of storage servers 160, as shown. In some implementations, each of the storage servers 160 may be implemented by using a computing device, such as the computing device 800, which is discussed further below with respect to FIG. 8. In some implementations, the storage servers 160 may be configured to store a plurality of target snapsets that contain snapshot data that is provided to the target system 150 by the source system 110. Although not shown, the target system 150 may include a management system and/or any other suitable type of component. In this regard, it will be understood that the present disclosure is not limited to any specific implementation of the target system 150.

Figure 2:
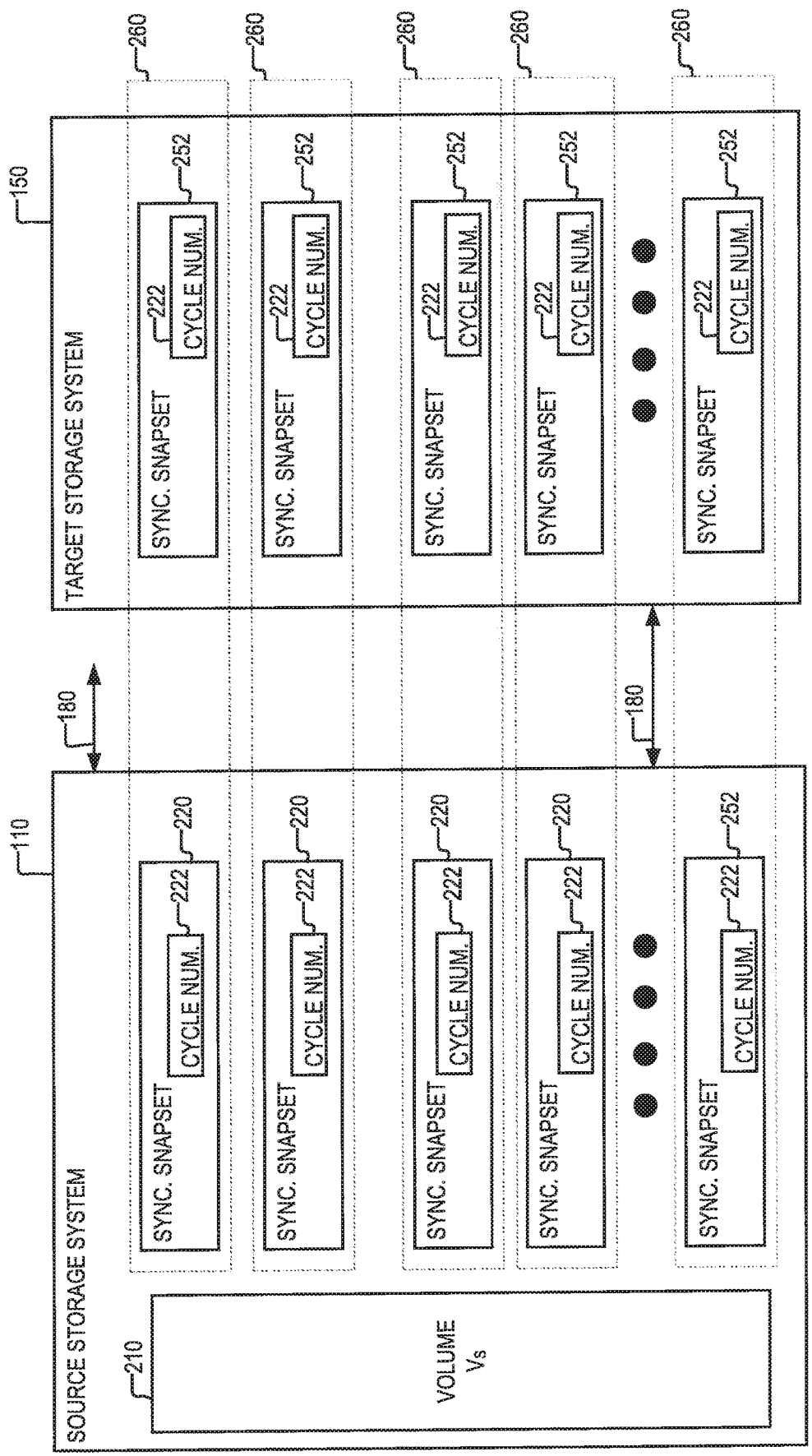
FIG. 2 is a diagram illustrating the operation of the storage system of FIG. 1, according to aspects of the disclosure.

FIG. 2 illustrates the operation of the storage system 100 in further detail. As illustrated, the source system 110 may implement a volume 210. The state of the volume 210, at different time instants, is recorded by using a set of source snapsets 220 and a set of target snapsets 252. As illustrated, the source snapsets 220 may be stored in the memory of the source system 110, and the target snapsets 252 may be stored in the memory of the target system 150. Each of the synchronous snapsets 220 and 252 may be associated with a respective cycle number 222. The cycle numbers 222 may identify (or otherwise indicate) one or more of: (i) the order in which the snapsets 220 and 252 are generated relative to one another, and (ii) the time when the data in the snapsets 220 and 252 is generated. Examples concerning the generation and replication snapshots is discussed in further detail in U.S. Pat. No. 10,310,951, titled Storage System Asynchronous Data Replication Cycle Trigger with Empty Cycle Detection, and U.S. Pat. No. 10,324,640, titled Storage System with Consistent Initiation of Data Replication Across Multiple Distributed Processing Modules, both of which are herein incorporated by reference in their entirety.

The source snapsets 220 and the target snapsets 252 may be generated as a result of performing synchronous replication, and for this reason they are herein referred to as "synchronous snapsets." Performing synchronous replication by the storage system 100 (or source system 110) may include transmitting synchronous snapshot data from any of the storage servers 120 to any of the storage servers 160, which are part of the target system 150. The synchronous snapshot data may be associated with an I/O request that is received at the storage system 100. The I/O request may include a request to delete data stored in the storage system 100, a request to write data to the storage system 100 and/or any other suitable type of I/O request, More particularly, the synchronous snapshot data may be generated based on data that is associated with the I/O request (e.g., data that is desired to be stored in the storage system 100 or data that is desired to be deleted from the storage system 100). In some implementations, when synchronous snapshot data is performed, the synchronous snapshot data that is associated with a particular I/O request (or a set of I/O requests) may be transmitted to the target system 150 concurrently (or otherwise in line) with the servicing of the I/O request by the storage system 100.

The source snapsets 220 and the target snapsets 252 may be arranged in snapset pairs 260 (e.g., recovery snapset pairs, etc.). Each of the snapset pairs may include one source snapset 220 and one target snapset 252, such that no two snapset pairs 260 include the same source snapset 220 and/or the same target snapset 252. The target snapset 252 in each snapset pair 260 may be a superset of the source snapset 220, which is part of the same snapset pair 260. As such, the target snapset 252 in each snapset pair 260 is guaranteed to include the same snapshot data as the source snapset 220 in the same snapset pair 260, and it may optionally include additional snapshot data, as well. The difference in content between the snapsets 220 and 252 in a particular snapset pair 260 may be due to the fact that the snapsets 220 and 252 are generated by using synchronous replication, which, in turn, affects how the snapset pairs 260 are created by the storage system 100. More particularly, when synchronous replication is performed by the storage system 100, replication data is written to the active snapset on the target system 150. When the management system 130 begins to create a new snapset pair 260 between the source system 110 and the target system 150, it may create a source snapset first, wait for all inflight I/Os at the time of source snap creation to complete, and then create the paired target snapset against the active snapset on target. Further information about the management and use of recovery snapset pairs may be found in U.S. patent application Ser. No. 16/042,363, titled METHOD TO SUPPORT SYNCHRONOUS REPLICATION FAILOVER, which is herein incorporated by reference in its entirety.

The management system 130 may use the snapsets 220 and 252 to perform an automatic rollback of the volume 210. According to the present disclosure, the term "rollback", as used in relation to a volume, may refer to an operation in which data that is presently stored in the volume (and/or representing the volume) is deleted, modified, overwritten, and/or otherwise manipulated in order to return the volume to one of its earlier states. For example, the performance of a rollback operation on the volume 210 may return the volume 210 to a state it was in 24 hours ago (or another past time instant). In this regard, performing a rollback of the volume 210 may, include: (i) deleting from the volume 210 any data that has been added in the past 24 hours (or another time period), and (ii) restoring to the volume 210 any data that has been deleted from the volume 210 in the past 24 hours (or another time period). In some respects, a rollback operation can be performed when data stored in the volume is corrupted (e.g., due to an error), when the storage system enters an inconsistent state, and/or for any other reason.

Returning to FIG. 1, the management system 130 may store in memory an active snapset pointer 132 and a snapset pair list 134. As the name suggests, the active snapset pointer 132 may identify the active snapset of the storage system 100, and the snapset pair list 134 may identify the snapset pairs 260, As illustrated, in FIG. 3, the snapset pair list 134 may include a plurality of entries 310. Each entry 310 may include a respective source snapset identifier 312 and a respective target snapset identifier 312. The identifiers 312 and 314 in each entry 310 may identify the target and source snapsets, respectively, that are part of the same snapset pair 260. In this regard, no two entries 310 may include the same target snapset identifier 312 and/or the same target snapset identifier 314. Although FIG. 2B depicts the snapset pair list 134 as a table, it will be understood that the present disclosure is not limited to any specific implementation of the snapset pair list 134. Although in the example of FIG. 2B, the snapset pair list 134 is stored in the memory of the management system 130, it will be understood that alternative implementations are possible in which at least a portion of the snapset pair list 134 is stored in the memory of another component of the storage system 100 (e.g., on at least one of the storage servers 120 and/or at least one of the storage servers 160).

Figure 4:
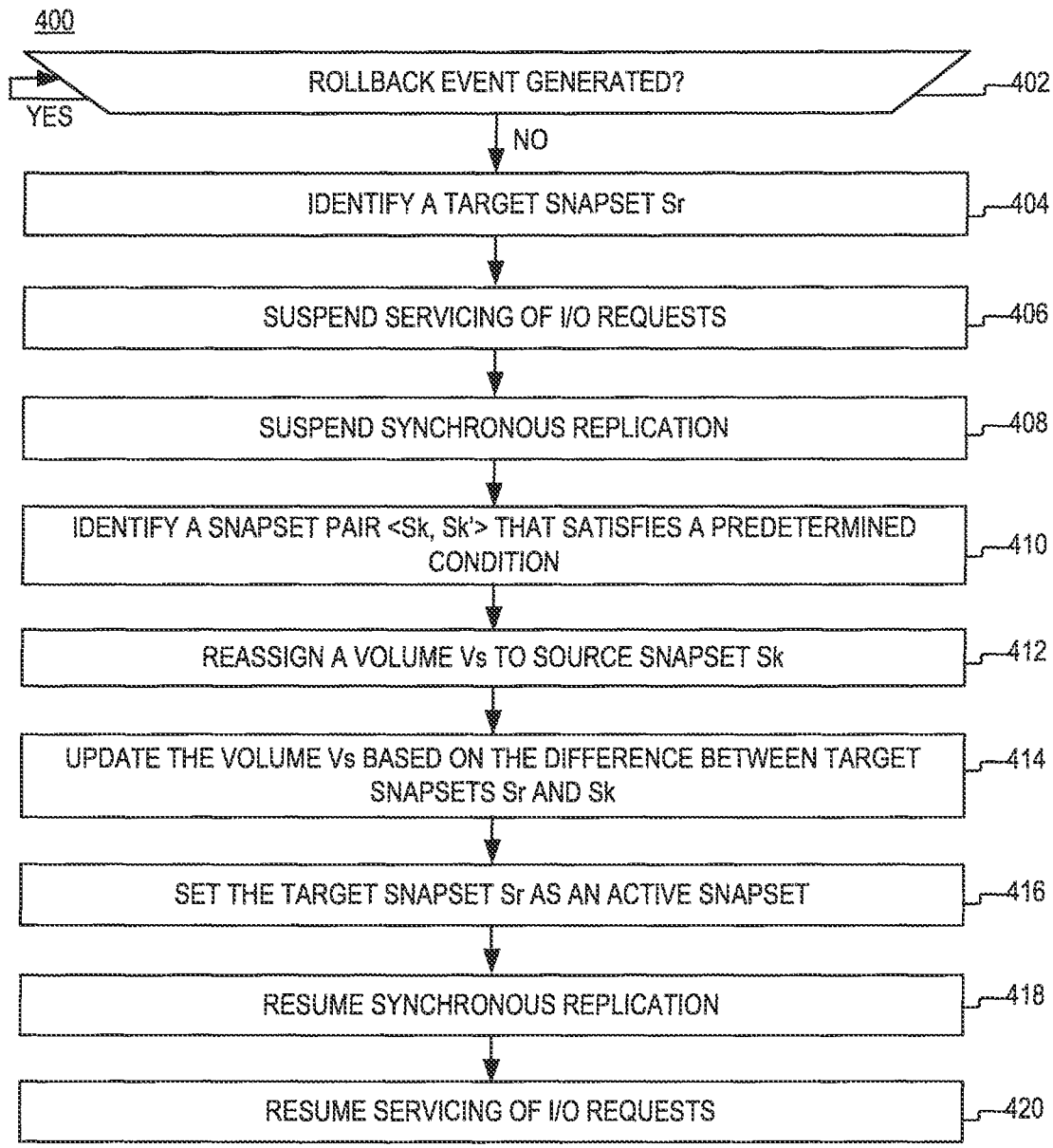
FIG. 4 is a flowchart of an example of a process, according to aspects of the disclosure.

FIG. 4 is a flowchart of an example of a process 400 for performing a rollback operation on the volume 210. According to the present example, the process 400 is performed by the management system 130. However, alternative implementations are possible in which any of the steps the process 400 is performed by one or more other components of the storage system 100 (e.g., one or more of the storage servers 120 and/or one or more of the storage servers 160). Stated succinctly, the present disclosure is not limited to any specific implementation of the process 400.

At step 402, the management system 130 detects whether a rollback event has been generated within the storage system 100. The rollback event may include any event that triggers the performance of a rollback operation on the volume 210. In some implementations, the rollback even may include an event that is generated by a process that is executed in the management system 130 when predetermined user input is received. Additionally or alternatively, in some implementations, the rollback event may be an event that is generated by one or more components of the storage system 100 when an error occurs. Stated succinctly, the present disclosure is not limited to any specific type of rollback event. If a rollback event is detected, the process 400 proceeds to step 404, Otherwise, if no rollback event is detected, step 402 is executed again.

At step 404, a target snapset Sr is selected to be rolled back to. The target snapset Sr may include any of the target snapsets 252 that are stored in the target system 150. In some implementations, the target snapset Sr may be selected based on a creation time Tr of the target snapset Sr. For example, if it is desired to revert the volume 210 to the state it was in at a particular time instant, a target snapset Sr may be selected whose creation time Tr is the same as, or as close as possible, to the particular time instant, Additionally or alternatively, in implementations in which the rollback event is triggered by the receipt of user input, the target snapset may be specified by the user input, Additionally or alternatively, in some implementations, the target snapset Sr may be selected based on a system setting that specifies how far back the volume 210 should be rolled back in the event of an error. The system setting may be stored in the memory of the management system 130 and/or the memory of another component of the storage system 100 Stated succinctly, the present disclosure is not limited to any specific method for selecting the target snapset Sr.

At step 406, the management system 130 suspends the servicing of I/O requests. In some implementations, suspending the servicing of I/O requests may include taking any action which causes the storage servers 120 and/or the storage servers 160 to stop executing new I/O requests that are destined for the volume 210. Such requests may include requests to write data to the volume 210 and/or requests to read data from the volume 210. Additionally or alternatively, in some implementations, suspending the servicing of I/O requests may include any action that causes the storage servers 120 to stop retrieving I/O requests from an incoming I/O request pool. However, it will be understood that the present disclosure is not limited to any specific method for suspending the servicing of I/O requests.

At step 408, the management system 130 suspends synchronous snapshot replication for the volume 210. In some implementations, suspending the synchronous snapshot replication may include taking any action that causes any of the storage servers 120 to stop generating new synchronous snapshot data for the volume 210 and/or transmitting new synchronous snapshot data to the storage servers 160, It will be understood that the present disclosure is not limited to any specific method for suspending synchronous snapshot replication.

At step 410, the management system 130 identifies a snapset pair <Sk, Sk'> that satisfies a predetermined condition. The snapset pair <Sk, Sk'> may include any of the snapset pairs 260, which are discussed above with respect to FIG. 2. As can be readily appreciated, the snapset pair <Sk, Sk'> may include a source snapset Sk and a target snapset Sk'. The source snapset Sk may include any of the source snapsets 220, and it may have a creation time Ts. The target snapset Sk' may include any of the target snapsets 252, and it may have a creation time Tt. The predetermined condition may include any condition that is based on at least one of (i) the creation time Tr of the snapset Sr, (ii) the respective creation time Ts of the source snapset Sk, and/or (iii) the respective creation time Tt of the target snapset Sk'. According to the present example, the predetermined condition is satisfied when $Tr \leq Ts \leq Tt$. In other words, the predetermined condition requires that the creation time Tr of the snapset Sr be less than or equal to the creation time of the Ts of the source snapset Sk. Furthermore, the predetermined condition requires that the creation time Ts of the source snapset Sk be less than or equal to the creation time Tt of the target snapset Tt.

At step 412, the management system 130 reassigns the volume 210 to the target snapset Sk. In some implementations, reassigning the volume 210 to the source snapset Sk may include taking any action that results in the volume 210 being returned to the state identified (or otherwise represented) by the source snapset Sk.

At step 414, the management system updates the volume 210 based on the difference in content between the target snapsets Sr and Sk. The manner in which step 414 is executed is discussed further below with respect to FIG. 3.

At step 416, the management system 130 sets the target snapset Sr as the active snapset of the storage system 100. In some implementations, setting the target snapset Sr as the active snapset may include changing the value of the active snapset pointer 132 to identify the target snapset Sr.

At step 418, the management system 130 causes the storage system 100 to resume synchronous replication.

At step 420, the management system 130 causes the storage system 100 to resume servicing I/O requests.

Figure 5:
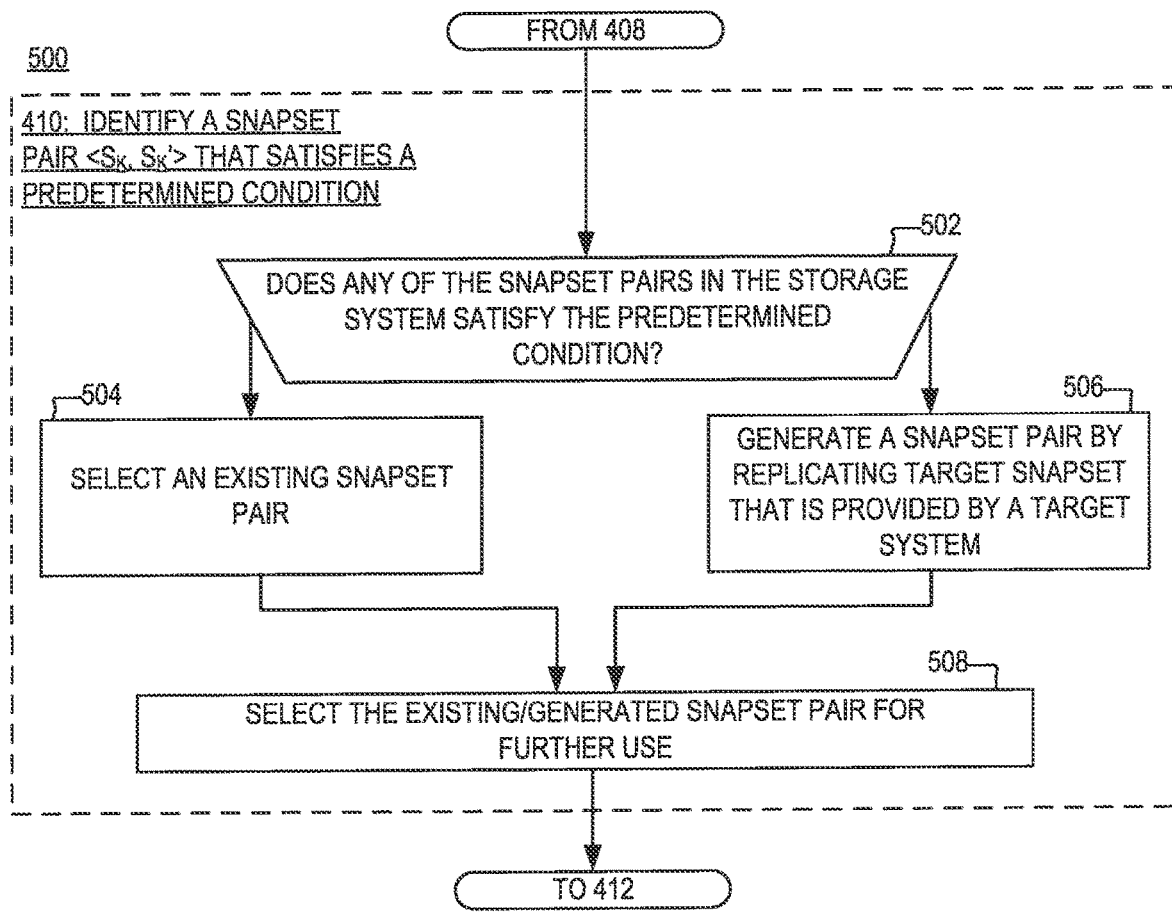
FIG. 5 is a flowchart of an example of a process, according to aspects of the disclosure.

FIG. 5 is a flowchart of an example of a process for identifying a snapset recovery pair that satisfies a predetermined condition, as specified by step 410 of the process 400. At step 502, the management system 130 detects whether any of the snapset pairs 260 satisfies the predetermined condition. When at least one of the snapset pairs 260 satisfies the predetermined condition, the process 500 proceeds to step 504. Otherwise, when none of the snapset pairs 260 satisfies the predetermined condition, the process 500 proceeds to step 506. At step 504, a snapset pair 260 is selected, which: (i) satisfies the predetermined condition, and (ii) which is the closest to the target snapset Sr. At step 506, an "artificial" snapset pair is generated by selecting one of the target snapset 252 that are stored in the target system 150 and replicating it. As a result of the replication, the artificial snapset pair, that is generated at step 506, may include two identical copies of the same target snapset 252. At step 508, the snapset pair obtained at steps 504/506 is selected as the pair <Sk, Sk'>, after which the process 600 returns to step 414 of the process 400.

According to aspects of the disclosure, a snapset pair 260 is considered 'the closest" to the target snapset Sr, among all snapset pairs 260 which satisfy the predetermined condition, when the creation time of the source snapset 220 in that pair is less than the creation time of the source snapset in any of the remaining snapset pairs 260 that satisfy the predetermined condition. In some implementations, the target snapset 252 that is replicated at step 504 may include the target snapset 252 that is created immediately after the target snapset Sr. However, it will be understood that the present disclosure is not limited to any specific method for selecting the target snapset 252 that is replicated at step 506.

Figure 6:
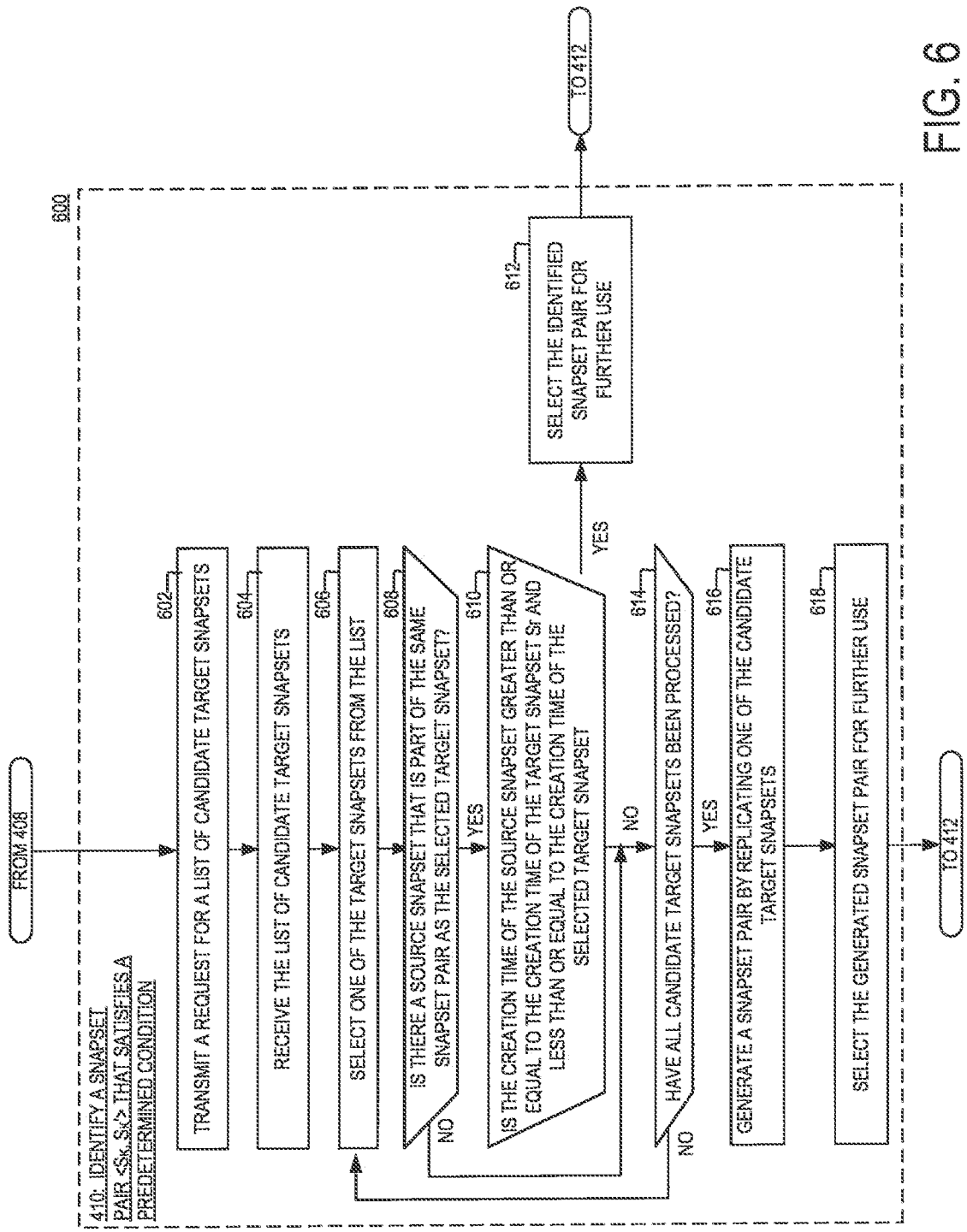
FIG. 6 is a flowchart of an example of a process, according to aspects of the disclosure.

FIG. 6 is a flowchart of an example of a process for identifying a snapset recovery pair that satisfies a predetermined condition, as specified by step 410 of the process 400.

At step 602, the management system 130 transmits, to the target system 150, a request for a list of candidate target snapsets. In some implementation, the request may include one or more of an identifier corresponding to the target snapset Sr and/or an earliest creation time for the candidate target snapsets 252.

At step 604, the management system 130 receives the list of candidate target snapsets 252. In some implementations, the list may include all or at least some of the target snapsets 252 that are stored in the target system 150, which have a creation time that is later than the creation time of the target snapset Sr (and/or later than a creation time specified in the request).

At step 606, the management system 130 selects one of the candidate target snapsets 252 from the list, in some implementations, the candidate target snapsets 252 may be selected in the order of their creation times, starting with the candidate target snapset 252 that has the earliest creation time among all target snapsets 252 in the list.

At step 608, the management system 130, detects if a (non-corrupt) source snapset 220 is available in the source system 110, which is part of the same snapset pair 260 as the selected target snapset 252. In some implementations, the management system may detect if such a source snapset 220 is available, be performing a search of the snapset pair list 134 (while using an identifier of the selected target snapset 252 as the search key). If such a source snapset 220 is available, the process proceeds to step 610, Otherwise, the process proceeds to step 614.

At step 610, the management system 130 determines if the creation time of the source snapset 220 (identified at step 608) is greater than or equal to the creation time of the target snapset Sr and less than or equal to the creation time of the selected target snapset. If the creation time of the source snapset 220 (identified at step 608) is greater than or equal to the creation time of the target snapset Sr and less than or equal to the creation time of the selected target snapset 252, the process 600 proceeds to step 612. Otherwise, the process 600 proceeds to step 614.

At step 612, the snapset pair which includes the target snapset 252 (selected at step 606) and the source snapset 220 (identified at step 608) is selected as the pair <Sk, Sk'>, after which the process 600 returns to step 412 of the process 400.

At step 614, a determination is made if each of the candidate target snapsets 252 have been processed (e.g., by a respective iteration of steps 606-610). If there are one or more candidate target snapsets 252 in the list that remain to be processed, the process 600 returns to step 606, and another one of the candidate target snapset 252 is selected. Otherwise, if all candidate target snapsets 252 in the list (received at step 604) have been selected already, and the management system 130 has been unable to identify a suitable snapset pair, the process 600 proceeds to step 616.

At step 616, the management system 130 generates an artificial snapset pair by replicating one of the target snapsets in the candidate list. As noted above, the artificial snapset pair may include two identical copies of the same target snapset. In some implementations, generating the artificial snapset pair may include: (i) identifying a target snapset 252 in the candidate list which has the earliest creation time among all target snapsets 252 in the list, (ii) transmitting to the target system 150 a request for the identified target snapset 252, and (iii) receiving the target snapset 252 from the target system 150 (over communications network 180). As can be readily appreciated, creating an "artificial" snapset pair is less efficient than using a preexisting snapset pair because it requires the transmission of an entire target snapset from the target system 150 to the source system 110.

At step 618, the artificial snapset pair which includes the target snapset (selected at step 606) and the source snapset 220 (identified at step 608) is selected as the pair <Sk, Sk'>, after which the process 600 returns to step 414 of the process 400.

Figure 7:
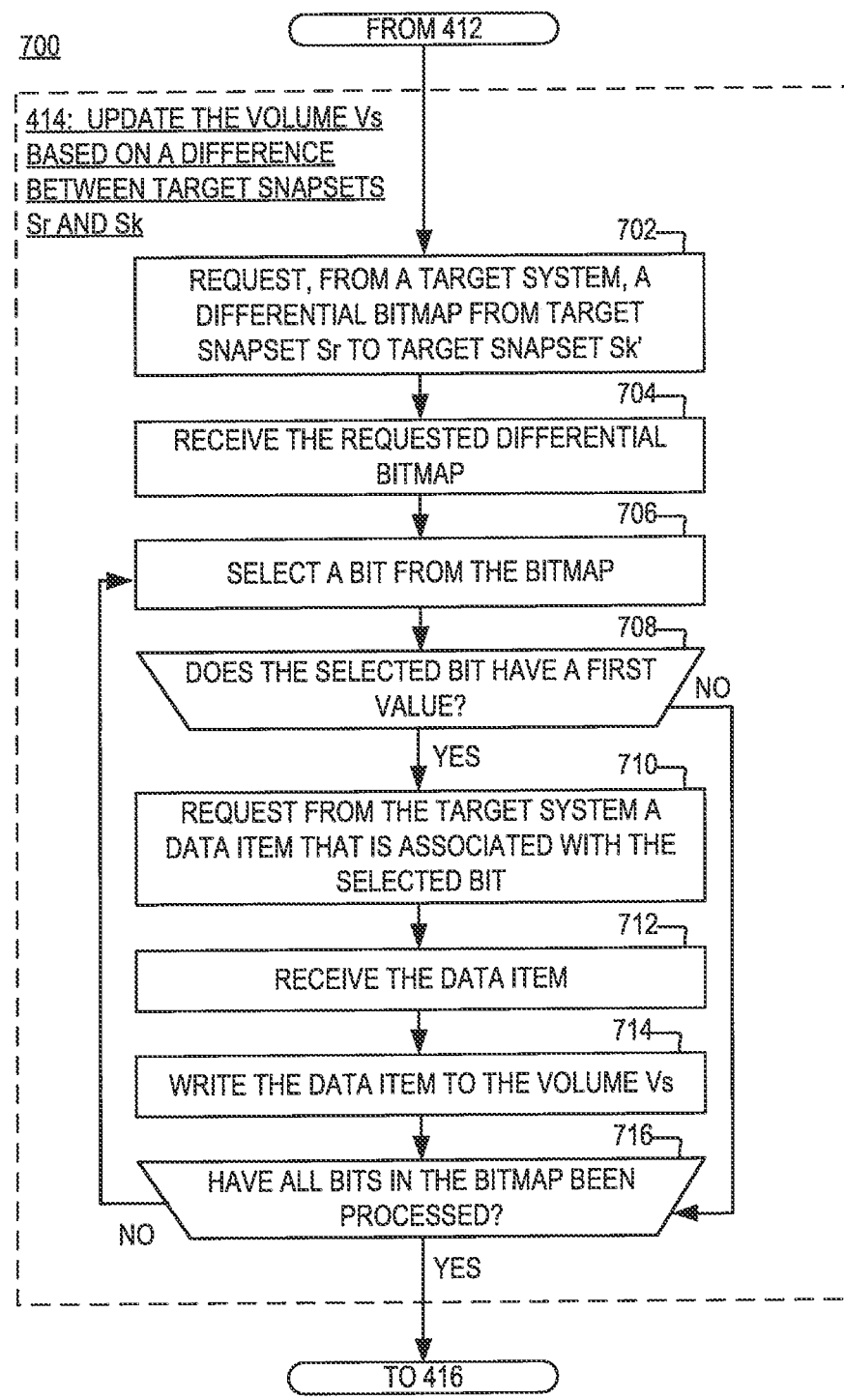
FIG. 7 is a flowchart of an example of a process, according to aspects of the disclosure.

FIG. 7 is a flowchart of a process 700 for updating the volume 210 based on a difference between target snapsets Sr and Sk', as specified at step 414 of the process 400.

At step 702, the management system 130 requests, from the target system 150, a differential bitmap from target snapset Sr to target snapset Sk'. At step 704, the management system 130 receives the differential bitmap from the target system 150. The differential bitmap may include a plurality of bits, Each hit may be associated with a different address in the volume 210 (e.g., a different page, a different block, etc.), If the content of an address (i.e., the content of a memory location associated with the address) has changed after the creation time Tr of the target snapset Sr, the bit (in the bitmap), which corresponds to the address, may be set to a first value (e.g., '1'). By contrast, if the content of the address has not changed after the creation time Tr, the bit, Which corresponds to the address, may be set to a second value (e.g., '0'). In some implementations, the differential bitmap may be generated by the target system 150 based on the target snapset Sr, the target snapset Sk, and one or more other target snapsets 252, which are created after the snapset Sr and before the snapset Sk'. At step 706, the management system 130 selects a bit from the bitmap. At step 708, the management system 130 determines if the selected hit has the first value (e.g., '1'). If the selected bit has the first value, the process proceeds to step 710. Otherwise, if the selected bit has the second value (e.g., '0'), the process 700 proceeds to step 716.

At step 710, the management system 130 requests a data item associated with the selected bit's corresponding address in the source volume 210. The requested data item may be one which has been stored, at the corresponding address in the volume 210, when the snapset Sr was created and which had been subsequently erased and modified. In other words, the requested data item may be one which is represented in the target snapset Sr, and not represented in the target snapset Sk'. The data item may include a block of data (which was stored in the volume 210), a hash digest of a block of data (which was stored in the volume 210), and/or any other suitable data item that can be used to revert the volume 210 to the state it was in when the target snapset Sr was created (i.e., to the state represented/identified by the target snapset Sr.)

At step 712, the management system 130 receives the data item. At step 714, the management system 130 writes the data item to volume 210 (at the address corresponding to the selected bit). At step 716, the management system 130 determines if all bits in the bitmap have been processed. If all bits have been processed, the process 700 returns to step 416 of the process 400. Otherwise, if there are bits in the bitmap that still remain to be processed, the process 700 returns to step 706, and another bit is selected.

FIGS. 4-7 illustrate an example of a process in which a volume 210 is rolled back to a target snapset Sr without having to transport (in most circumstances) the entire content of a target snapset Sr from the target system 150 to the source system 110. The process includes two main stages. In the first stage, the volume 210 is rolled back by using a source snapset Sk (which in most circumstances would be available on the source system 110). In the second stage, individual data items are identified that have been deleted or modified since the creation of the snapset Sr and written back to the volume 210, effectively returning the volume 210 to the state represented by the target snapset Sr. In some respects, the process is advantageous because (under most circumstances), the process does not require the entire content of a target snapset to be transmitted from the target system 150 to the source system 110 in order for the volume 210 to be reverted to the state represented by the target snapset.

Furthermore, the process discussed with respect to FIGS. 4-7 is advantageous because it can be performed automatically. In conventional remote synchronous replication configurations, previous point-in-time snapshots are often saved at the target system to relieve the source system from the burden of snapshot life cycle management and snapshot integrity check overhead. When there is a failed upgrade, or data corruption is detected in production volumes, production storage may need to rollback to previous point-in-time copies stored in the target system. In some systems, there may be no easy way to do that for active sync replication volumes. In such systems, to rollback to remote snap content, usually, an administrator has to perform sync replication session failover and fallback, which involves lots of metadata and data revalidation and resync. The whole process is manual and tedious, time and resource consuming, and error prone.

According to the Example of FIGS. 1-7, the phrase "creation time of a snapset" refers to the time identified by the snapsets' cycle number. However, alternative implementations are possible in which the creation time of a snapset includes one of, a time when the snapset is instantiated, a time when the snapset is last updated, a time identified by a particular timestamp in the snapset, that is different from the snapsets cycle number, and/or any other suitable time.

Figure 8:
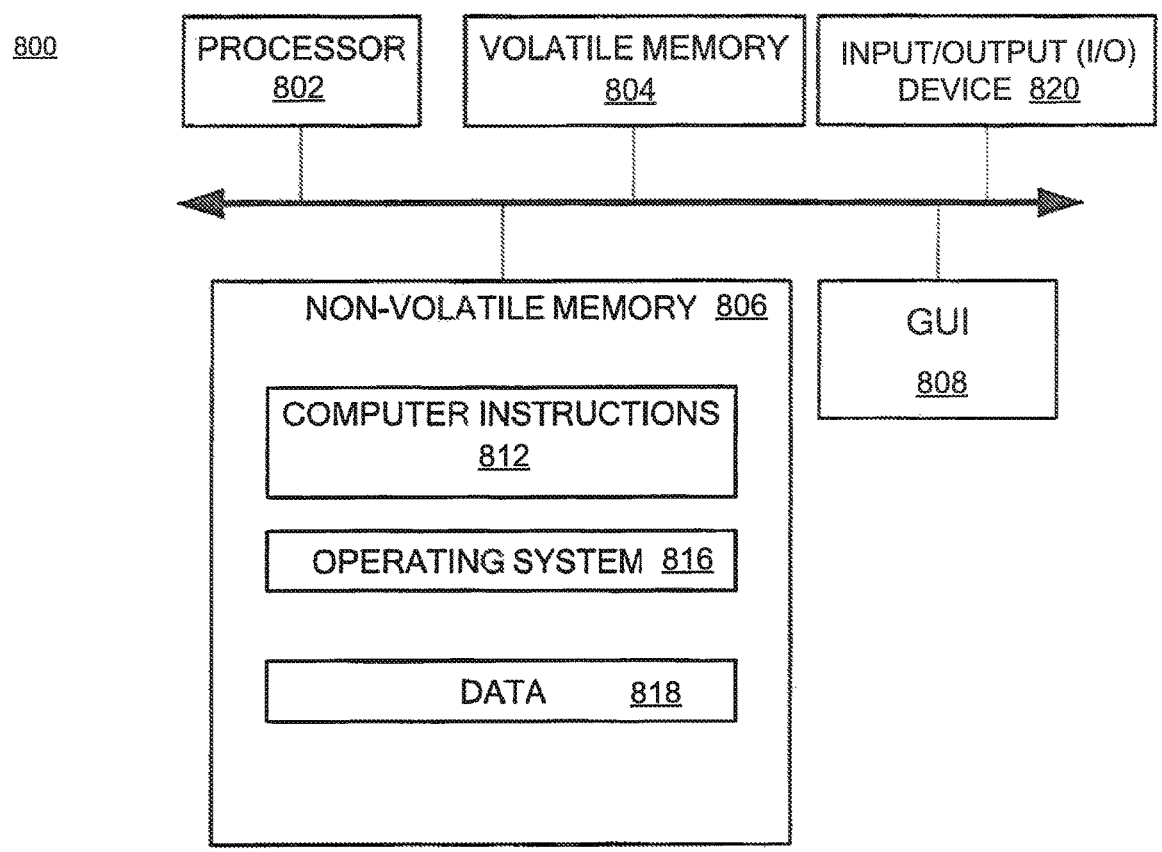
FIG. 8 is a diagram of an example of a computing device, according to aspects of the disclosure.

Referring to FIG. 8, in some implementations, any of the management system 130, the storage servers 120, and the storage servers 160 may be implemented as one or more computing devices 800. Each computing device 800 may include processor 802, volatile memory 804 (e.g., RAM), non-volatile memory 806 (e.g., a hard disk drive, a solid state drive such as a flash drive, a hybrid magnetic and solid state drive, etc.), graphical user interface (GUI) 808 (e.g., touchscreen, a display, and so forth) and input/output (I/O) device 820 (e.g., a mouse, a keyboard, etc.). Non-volatile memory 806 stores computer instructions 812, an operating system 816 and data 818 such that, for example, the computer instructions 812 are executed by the processor 802 out of volatile memory 804 to perform at least a portion of the process 400 and/or any other function of the storage system 100.

FIGS. 1-8 are provided as an example only. At least some of the steps discussed with respect to FIGS. 1-8 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits, Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a storage system including a source system that is coupled to a target system, the method comprising:
   detecting a rollback event that is associated with a source volume Vs; and
   performing a rollback of the source volume Vs in response to the rollback event, wherein performing the rollback of the source volume Vs includes:
   identifying a target snapset Sr to be rolled back to, the target snapset Sr having a creation time Tr;
   identifying a snapset recovery pair including a source snapset Sk and a target snapset Sk', the source snapset having a creation time Ts, and the target snapset having a creation time Tt, such that $Tr \leq Ts \leq Tt$;
   assigning the source volume Vs to the source snapset Sk; and
   update the source volume Vs based on a difference between the target snapset Sr and the target snapset Sk', the updating including: (i) identifying, based on the target snapsets Sr and Sk', data that was stored in the source volume Vs when the snapset Sr was created and which was subsequently modified or deleted, and updating the source volume Vs based on the identified data after the source volume Vs is assigned to the source snapset Sk.

2. The method of claim 1, Wherein identifying the snapset pair includes:
receiving a list of target snapsets from the target system;
selecting one of the target snapsets identified in the list; and
identifying a source snapset that belongs in the same snapset pair as the selected target snapset.

3. The method of claim 1, wherein identifying the snapset pair includes, generating the source snapset Sk by replicating the target snapset SIC, the target snapset Sk' being replicated in response to detecting that a pre-existing snapset pair cannot be identified.

4. The method of claim 1, further comprising:
stopping a synchronous replication of the source volume Vs before the source volume Vs is assigned to the source snapset Sk; and
resuming the synchronous replication of the source volume after the source volume Vs is updated.

5. The method of claim 1, wherein overwriting the source volume includes:
receiving a bitmap from the target system that is generated based on the target snapset Sr and the target snapset Sk', the bitmap including a plurality of bits, each bit being associated with a different respective address in the source volume Vs, each bit indicating whether the bit's respective address in the source volume Vs has been modified after the target snapset Sr was created;
identifying, based on the bitmap, one or more data items;
requesting the identified data items from the target system;
receiving the data items from the target system; and
updating the source volume Vs based on the data items.

6. The method of claim 1, further comprising setting the snapset Sr as an active snapset of the storage system.

7. The method of claim 1, wherein the rollback event is generated in response to an error in the target system.

8. A system comprising:
a memory; and
at least one processor operatively coupled to the memory, the at least one processor being configured to perform the operations of detecting a rollback event that is associated with a source volume Vs, and performing a rollback of the source volume Vs in response to the rollback event, wherein performing the rollback of the source volume Vs includes:
identifying a target snapset Sr to be rolled back to, the target snapset Sr having a creation time Tr, the target snapset Sr being stored in a target system;
identifying a snapset recovery pair including a source snapset Sk and a target snapset Sk', the source snapset having a creation time Ts, and the target snapset having a creation time Tt, such that Tr≤Ts≤Tt;
assigning the source volume Vs to the source snapset Sk; and
update the source volume Vs based on a difference between the target snapset Sr and the target snapset Sk', the updating including: (i) identifying, based on the target snapsets Sr and Sk', data that was stored in the source volume Vs when the snapset Sr was created and which was subsequently modified or deleted, and updating the source volume Vs based on the identified data after the source volume Vs is assigned to the source snapset Sk.

9. The system of claim 8, wherein identifying the snapset recovery pair includes:
receiving a list of target snapsets from the target system;
selecting one of the target snapsets identified in the list; and
identifying a source snapset that belongs in the same snapset pair as the selected target snapset.

10. The system of claim 8, wherein identifying the snapset pair includes, generating the source snapset Sk by replicating the target snapset Sk', the target snapset Sk' being replicated in response to detecting that a pre-existing snapset pair cannot be identified.

11. The system of claim 8, wherein performing the rollback of the source volume Vs further includes:
stopping a synchronous replication of the source volume Vs before the source volume Vs is assigned to the source snapset Sk; and
resuming the synchronous replication of the source volume after the source volume Vs is updated.

12. The system of claim 8, wherein overwriting the source volume includes:
receiving a bitmap from the target system that is generated based on the target snapset Sr and the target snapset Sk', the bitmap including a plurality of bits, each bit being associated with a different respective address in the source volume Vs, each bit indicating whether the bit's respective address in the source volume Vs has been modified after the target snapset Sr was created;
identifying, based on the bitmap, one or more data items;
requesting the identified data items from the target system;
receiving the data items from the target system; and
updating the source volume Vs based on the data items.

13. The system of claim 8, wherein performing the rollback of the source volume Vs further includes setting the snapset Sr as an active snapset of a storage system.

14. The system of claim 8, wherein the rollback event is generated in response to an error in the target system.

15. A non-transitory computer-readable, storage medium storing one or more processor-executable instructions, which, when executed by at least one processor of a storage system, cause the processor to perform the operations of:
detecting a rollback event that is associated with a source volume Vs, and
performing a rollback of the source volume Vs in response to the rollback event, wherein performing the rollback of the source volume Vs includes:
identifying a target snapset Sr to be rolled back to, the target snapset Sr having a creation time Tr, the target snapset Sr being stored in a target system;
identifying a snapset recovery pair including a source snapset Sk and a target snapset Sk', the source snapset having a creation time Ts, and the target snapset having a creation time Tt, such that Tr≤Ts≤Tt;
assigning the source volume Vs to the source snapset Sk; and
update the source volume Vs based on a difference between the target snapset Sr and the target snapset Sk', the updating including: (i) identifying, based on the target snapsets Sr and Sk', data that was stored in the source volume Vs when the snapset Sr was created and which was subsequently modified or deleted, and updating the source volume Vs based on the identified data after the source volume Vs is assigned to the source snapset Sk.

16. The non-transitory computer-readable storage medium of claim 15, wherein identifying the snapset pair includes;
  receiving a list of target snapsets from the target system;
  selecting one of the target snapsets identified in the list; and
  identifying a source snapset that belongs in the same snapset pair as the selected target snapset.

17. The non-transitory computer-readable storage medium of claim 15, wherein identifying the snapset pair includes, generating the source snapset Sk by replicating the target snapset Sk', the target snapset Sk' being replicated in response to detecting that a pre-existing snapset pair cannot be identified.

18. The non-transitory computer-readable storage medium of claim 15, wherein performing the rollback of the source volume Vs further includes:
  stopping a synchronous replication of the source volume Vs before the source volume Vs is assigned to the source snapset Sk; and
  resuming the synchronous replication of the source volume after the source volume Vs is updated.

19. Non-transitory computer-readable storage medium of claim 15, wherein overwriting the source volume includes:
  receiving a bitmap from the target system that is generated based on the target snapset Sr and the target snapset Sk', the bitmap including a plurality of hits, each bit being associated with a different respective address in the source volume Vs, each bit indicating whether the bit's respective address in the source volume Vs has been modified after the target snapset Sr was created;
  identifying, based on the bitmap, one or more data items;
  requesting the identified data items from the target system;
  receiving the data items from the target system; and
  updating the source volume Vs based on the data items.

20. The non-transitory computer-readable storage medium of claim 15, wherein performing the rollback of the source volume Vs further includes setting the snapset Sr as an active snapset of the storage system.

* * * * *